United States Patent [19]

Adkins et al.

[11] Patent Number: 5,462,768
[45] Date of Patent: Oct. 31, 1995

[54] SCREEN PRINTING PROCESS USING WATER-BASED CHEMICAL COMPOSITION

[75] Inventors: Ronald R. Adkins, Woodbury; Charles J. Fabbrini, Stillwater Township, Washington County; Neal T. Strand, Woodbury, all of Minn.

[73] Assignee: Minnesota Mining and Manufacturing Company, St. Paul, Minn.

[21] Appl. No.: 33,133

[22] Filed: Mar. 18, 1993

Related U.S. Application Data

[60] Division of Ser. No. 914,481, Jul. 21, 1992, abandoned, which is a continuation-in-part of Ser. No. 743,151, Aug. 9, 1991, abandoned.

[51] Int. Cl.$^6$ ......................................... B05D 1/36
[52] U.S. Cl. .................. 427/265; 427/282; 101/114; 101/129
[58] Field of Search ........................ 101/114, 129; 427/265, 282

[56] References Cited

U.S. PATENT DOCUMENTS

| | | | |
|---|---|---|---|
| 2,651,871 | 9/1953 | Lynden | 41/26 |
| 3,533,811 | 10/1970 | Clements et al. | 196/24 |
| 4,116,903 | 9/1978 | Lietz et al. | 260/29.6 |
| 4,125,499 | 11/1978 | Howard | 260/22 T |
| 4,335,163 | 6/1982 | Wong | 427/256 |
| 4,384,065 | 5/1983 | Wong | 524/376 |
| 4,636,546 | 1/1987 | Chao | 524/507 |
| 4,637,308 | 1/1987 | Vidoni | 101/114 |
| 4,647,610 | 3/1987 | Sperry et al. | 524/377 |
| 4,704,961 | 11/1987 | Jensen et al. | 101/114 |
| 4,724,761 | 2/1988 | Bubley | 101/127.1 |
| 4,729,306 | 3/1988 | Bubley | 101/114 |
| 4,762,875 | 8/1988 | Gold | 524/248 |
| 4,812,492 | 3/1989 | Eckes et al. | 523/351 |
| 4,849,262 | 7/1989 | Uhl et al. | 524/507 X |
| 4,880,867 | 11/1989 | Gobel et al. | 524/507 X |
| 4,927,663 | 5/1990 | Small et al. | 427/40 |
| 4,927,876 | 5/1990 | Coogan et al. | 524/507 X |
| 4,948,829 | 8/1990 | Mitsujii et al. | 524/507 X |
| 4,954,556 | 9/1990 | Bull et al. | 524/378 |
| 4,968,536 | 11/1990 | Goldner et al. | 524/507 X |
| 4,977,207 | 12/1990 | Hoefer et al. | 524/507 |
| 4,980,408 | 12/1990 | Chan | 524/504 |
| 4,983,662 | 1/1991 | Overbeek et al. | 524/507 X |
| 5,006,413 | 4/1991 | Hartog et al. | 524/507 X |
| 5,011,881 | 4/1991 | Fugu et al. | 524/507 X |
| 5,098,947 | 3/1992 | Metzger et al. | 524/507 |

FOREIGN PATENT DOCUMENTS

| | | |
|---|---|---|
| 0255078A2 | 2/1988 | European Pat. Off. . |
| 03091663 | 10/1990 | European Pat. Off. . |
| 2377426 | 9/1978 | France . |
| 1560870 | 2/1980 | France . |
| 2105742 | 4/1979 | Germany . |
| 59-091088 | 5/1984 | Japan . |
| 2-122857 | 5/1990 | Japan . |
| 1164787 | 7/1968 | United Kingdom . |
| 2134533 | 8/1984 | United Kingdom . |
| 2195954 | 4/1988 | United Kingdom . |
| WO88/00961 | 2/1988 | WIPO . |

OTHER PUBLICATIONS

Patent Abstract of Japan, vol. 9, No. 153, Jun. 1985.
Van Druppen, "Manual for Screen Printing," (Verlag der Siebdruck, Lubeck, Germany, 1982).
Sheer, "Graphic Screen Printing," (Zurich Bolting Cloth Mfg. Co. Ltd., Rushlikone, Switzerland).
Kosloff, "Screen Printing Techniques," Sign of the Time, (Cincinnati, Ohio, 1981).

*Primary Examiner*—Judy M. Reddick
*Attorney, Agent, or Firm*—Gary L. Griswold; Walter N. Kirn; Carolyn V. Peters

[57] ABSTRACT

A method of screen printing water-based chemical compositions is provided, where the water-based chemical compositions are virtually solventless, that is, having less than 12% volatile organic solvents when press ready, and the method produces screen printed substrates that are weather-resistant and have excellent color retention.

5 Claims, 2 Drawing Sheets

Fig. 4

SCREEN PRINTING PROCESS USING WATER-BASED CHEMICAL COMPOSITION

CROSS-REFERENCE(S) TO RELATED APPLICATION

This is a divisional of the application, Ser. No. 07/914,481, filed Jul. 21, 1992, now abandoned, a continuation-in-part of parent application, Ser. No. 07/743,151, filed Aug. 9, 1991, now abandoned.

TECHNICAL FIELD

This invention relates to water-based chemical compositions, particularly to press ready water-based inks and clear coats, and to a screen printing process using the water-based chemical compositions.

BACKGROUND OF THE INVENTION

Polymeric compositions borne in organic solvents rely on solvents or solvent blends to control the drying characteristics of the compositions, according to the application requirements. The disadvantages of such organic solvent based compositions are the difficulties of clean-up, the toxic nature of organic solvents, environmental pollution, health hazards due to toxic solvent fumes, and the relatively high cost of organic solvents that are ultimately wasted.

Water-containing polymeric products such as water-borne paints and water-based flexographic, gravure, and screen printing compositions find increasing utility due to their safety, and economy. Furthermore, they tend to be environmentally sound, since they tend to have small amounts of solvent, that is, typically between 10% and 35% solvent by weight. However, water-based screen printing inks have a history of being difficult to process, exhibiting problems, such as drying and plugging up printing greens, poor adhesion to vinyl and acrylic substrates, poor outdoor durability, poor printing quality, that is, ink flow and leveling problems, and limited long run capability.

Some conventional flexographic and gravure water-based inks typically have 10% or less by weight organic solvents, primarily alcohols. In these printing methods, the inks are printed on a rotary press at fast speeds where drying is not a problem. Usually, these water-based inks dry too slowly for these methods.

However, drying characteristics of screen-printing water-borne compositions are variable and not easily controllable, since the characteristics are tied to the evaporation characteristics of the water and organic solvents. The inability to control evaporation characteristics can lead to poor quality of a screen print, impaired efficiency of the screen due to ink skimming, that is, dried ink on the surface of the ink reservoir, and increased down-time of the printing equipment necessary to remove residually dried inks.

Coalescing aids are commonly used in screen printing inks and some examples of coalescing aids typically used include hydrocarbons, alcohol esters, glycol ether esters, glycol ethers, and glycols. However, this additive can be costly and is an organic solvent with all the disadvantages associated with organic solvents.

SUMMARY OF THE INVENTION

Briefly, in one aspect of the present invention, a press ready water-based chemical composition suitable for screen printing is provided comprising:

(a) 35 to 85% by weight an acrylic emulsion, urethane dispersion, an acrylic/urethane emulsion, or a styrene/acrylic emulsion; and (b) 0 to 25% by weight durable pigment.

The water-based chemical compositions of the present invention can further include additives such as, defoamers, thickners, UV absorbers, biocides, fungicides, thickeners, and leveling and flow agents and when present are used in amounts consistent with and effective for their intended purpose. Such additives and amounts (% by weight) based on the total water-based chemical composition comprise:

(1) 1.0 to 5.0% by weight defoamer;

(2) 0 to 1.0% by weight biocide;

(3) 0.1 to 1.25% by weight fungicide;

(4) 0.5 to 2.0% by weight UV absorber;

(5) 0 to 1.0% by weight flow agent;

(6) 0 to 1.0% by weight leveling agent;

(7) 0.6 to 2.0% by weight thickener; and (8) 0.5 to 2.5% by weight light stabilizer.

Within the possible ranges, the preferred ranges and materials are as follows:

(a) 55 to 80% by weight an acrylic emulsion, urethane dispersion, an acrylic/urethane emulsion, wherein the acrylic/urethane emulsion has a weight ratio in the range of 80:20 to 50:50, or a styrene/acrylic emulsion, wherein the styrene/acrylic emulsion has a weight ratio in the range of 70:30 to 30:70; and (b) 0 to 16.0% by weight durable pigment.

Within the possible ranges of additives, the preferred ranges and materials, if present are as indicated below. The amounts of additives are (% by weight) based on the total water-based chemical composition.

(1) 1.5 to 3.0% by weight hydrophobic mineral oil-based defoamer;

(2) 0.1 to 0.5% by weight amine-based biocide;

(3) 0.1 to 0.3% by weight carbamate-based fungicide;

(4) 1.25 to 1.75% by weight benzophenone;

(5) 0.07 to 0.12% by weight fluorosurfactant;

(6) 0.07 to 0.12% by weight silicone glycol;

(7) 0.8 to 1.6% by weight nonionic surfactant; and (8) 1.0 to 2.0% by weight light stabilizer.

The water-based chemical compositions having 2.0 to 25% by weight, preferably 3 to 15% by weight, of a pigment or mixture of pigments are useful as press ready, semen printing inks. The water-based chemical compositions without pigments are useful for screen printing protective clear coats. These water-based chemical compositions and the process for screen printing are useful in fabricating print markings, identification graphics, nameplates, signs, fascia and the like.

In another aspect of the present invention, a process is provided for screen printing comprising the steps:

(a) pre-conditioning a screen-printing stencil with water for a pre-determined period of time prior to applying a press-ready, water-based chemical composition;

(b) saturating a volume above a printing surface with water vapor, such that the water vapor is intimately positioned over the printing surface, such that the volume remains saturated with water vapor during subsequent steps (c) and (d);

(c) applying a press-ready, water-based chemical composition of the present invention to the surface of the pre-conditioned screen-printing stencil; and (d) screen printing a substrate.

The process of the present invention provides a method of screen printing using the press ready water-based chemical compositions that are virtually solventless. The screen printing process is generally carried out on a flatbed screen press and surprisingly provides excellent image detail, weather resistance, and color retention.

Advantageously, the present invention offers press-ready, water-based chemical compositions that use low toxicity, nonflammable and nonhazardous materials, and generally exceeds the Environmental Protection Agency (EPA) and Occupational Safety and Health Administration (OSHA) requirements.

As used in this application:

"clear coat" means an unpigmented water-based chemical composition;

"flood bar" and "flood blade" are used interchangeably and is used to distribute or spread a press-ready chemical composition evenly across a screen image area and forces the composition into the open areas of the stencil, such that the "squeegee" can deposit the composition onto the substrate;

"ink" means a pigmented water-based chemical composition;

"press-ready" means a chemical composition that has been adjusted for viscosity with an appropriate thinner and/or retarder to be ready for screen printing;

"screenability" means the ability of a composition to be used in a screen printing process;

"skimming" means the formation of a layer of dry composition on the surface of the printing stencil and press ready composition;

"uncoalesed" means without a film-forming volatile organic solvent; and

"virtually solventless" means less than 12% total solvent by weight when press-ready for use.

DETAILED DESCRIPTION OF THE PREFERRED EMBODIMENT(S)

The present invention provides screen printing water-based chemical compositions that are virtually solventless when "press ready" for use.

Press-ready, water-based chemical compositions prepared with pigment dispersions exhibit durability and weatherability for outdoor use and have excellent color retention characteristics. Water-based chemical compositions prepared without pigment exhibit weatherability for outdoor use, as well as providing a dirt resistant, protective coating to a screen print that has been printed with the water-based chemical compositions of the present invention. Durability and weatherability of the pigmented water-based chemical compositions are improved by overcoating with the unpigment water-based chemical composition.

Water-based chemical compositions of the present invention are formulated with acrylic-containing emulsion vehicles and/or polyurethane dispersion vehicles having a weight ratio of acrylic-containing emulsion to urethane dispersion in a ratio range of 100:0 to 0:100, preferably, the ratio range is 80:20 to 50:50. The combination of the acrylic-containing emulsion with a polyurethane dispersion can improve solvent resistance of the chemical composition. Further, such an acrylic/urethane combination can provide additional solvent and chemical resistance by addition of cross-linking or transfer agents to the compositions.

(Meth)acrylate polymers useful in the acrylic-containing emulsions include but are not limited to, polyisobutyl methacrylate, polymethyl methacrylate, polybutyl acrylate, polymethyl acrylate, polybutyl methacrylate, and polyethyl methacrylate. The acrylic-containing emulsion is generally from 100% by weight of single polymer to a mixture of polymers in the range of 10:90 to 90:10, nonlimiting examples of arcylic-containing emulsions include, polymethyl methacrylate/polybutyl methacrylate; polymethyl methacrylate/poly-n-butyl acrylate/polymethyl acrylate; and styrene/acrylic acid.

Urethanes dispersions suitable for practicing the present invention include, for example, aliphatic polyesters, and aliphatic polyethers, include for example, Neorez R-960 polyurethane dispersion.

Volatile organic solvents are not specifically added to the water-based chemical compositions of the present invention. However, the acrylic-containing emulsions and urethane dispersions contain co-solvents when the emulsions or dispersions are prepared. The co-solvents provide coalescent properties needed to achieve a desired minimum film forming temperature. The co-solvents can be a blend of glycol ethers, aromatic naphtha, ethylene glycol and the like. The volatile organic solvents (by weight) of the water-based chemical compositions of the present invention, when press-ready, is less than 12% by weight, preferably less than 10% by weight and more preferably less than 8% by weight.

Additives known to those skilled in the art, such as thickeners (adjust the viscosity), cross-linking or transfer agents, biocides (prevent bacterial deterioration), fungicides (prevent fungal growth); defoamers (prevent foaming during solution mixing and screen printing), flattening agents (reduce gloss of a clear coat), ultraviolet absorbers (provide protection from color changes, gloss loss and crack formation), light stabilizers (provide protection similar to and in conjunction with ultraviolet absorbers), flow agents (facilitate coating flow), and leveling agents (promote smoothness and gloss of the coating), if present, are added by weight at commercially recommended concentrations, that is, concentrations that are effective for their intended purpose. Although specific additives have been identified in the following Examples, it is within the scope of the present invention to use suitable additives as suggested by their intended purpose.

Pigments useful in the practice of the present invention are outdoor durable, and weatherable. Commerically available pigments are a pigment dispersion having a pigments solid content of from 30% to 60% depending on the pigment color. Pigments such as phthalocyanine blues and greens, quinacridone reds and isoindolinone yellows are commercially available for example, from Penn Color, under the trade name of "Aqualor."

Presently, there are no commercially available durable screen printing chemical compositions that when press-ready have less than 12% by weight of volatile organic solvents. The water-based chemical compositions are virtually solventless when press-ready, have good screenability, non-blocking, fast drying, good adhesion, low odor and have a viscosity in the range of 1.0 to 3.0 pascal second (Pa·s), preferably in the range of 1.0 to 2.8 Pa·s, using a Brookfield LVF Viscometer with spindle #4 at 60 rpm.

The water-based compositions can be used with any conventional screen printing method, preferably a process that inhibits the evaporation or drying of the chemical compositions. For example, such a process is described in DE-OS 21 05 742 wherein the process, in particular for screen printing with fast drying inks and/or inks containing volatile components is confined to a casing above the printing surface, and in that a saturated atmosphere is produced and maintained in the casing. The casing provided seals the volume above the screen printing surface in a gas-tight manner.

The screen printing process is generally carried out on a flatbed screen press and surprisingly provides excellent image detail, weather resistance, and color retention. Furthermore, the press-ready water-based chemical compositions are environmentally responsible and exceed EPA requirements and OSHA safety standards.

A particularly advantageous screen printing process comprises the steps:

(a) pre-conditioning a screen-printing stencil by wiping the stencil with water for a pre-determined period of time;

(b) providing a relatively high humidity; saturated volume above the printing surface, such that the saturated volume is intimately positioned over the printing surface, such that the volume remains saturated during subsequent steps (c) and (d);

(c) applying water-based chemical compositions to the surface of the screen-printing stencil;

(d) screen printing a substrate.

The first step of the screen printing process is to pre-condition a printing stencil. The majority of commercially known stencil coatings are aqueous emulsions and are cross-linked with sensitizers and are known to be hygroscopic to the extent, that as much as 20 to 30% water by weight of the stencil can be absorbed into the stencil from the water-based chemical composition. This absorption of water at the start-up of printing causes the plugging up of fine detail openings in a stencil. This problem is generally referred to as "screen dry in." Pre-conditioning the printing stencil comprises wiping the surface of the stencil with water, prior to the addition of the water-based chemical composition. This eliminates the absorption of water from the water-based ink during printing. Generally, this inhibits skimming of the chemical composition and "screen dry in" of the ink coating on the surface of the stencil.

The second step of the screen printing process involves providing a relatively high humidity, saturated volume of air encompassing the screen printing stencil. The humidity of the volume of air encompassing the screen printing stencil is typically in the range of 75% to 100% relative humidity, preferably in the range of 90% to 100% relative humidity, and more preferably in the range of 95% to 100% relative humidity.

When water vapor is used to saturate the volume, the vapor can be generated using an ultrasonic water vaporizer (for example, Sonicmisty™ CFK 1A available from Tamori Fog, Inc., Concord, Calif.). However, any process or method known to those skilled in the art to produce a saturated atmosphere of water vapor, mist, or highly humidified air is within the scope of the present invention. For example, in high humidity climates, the water-based chemical compositions may be used without any additional equipment. It would also be permissible to generate a high humidity atmosphere above the print surface by chilling the air volume, thus producing a "cloud" of water vapor immediately above the print surface.

Figure 1:
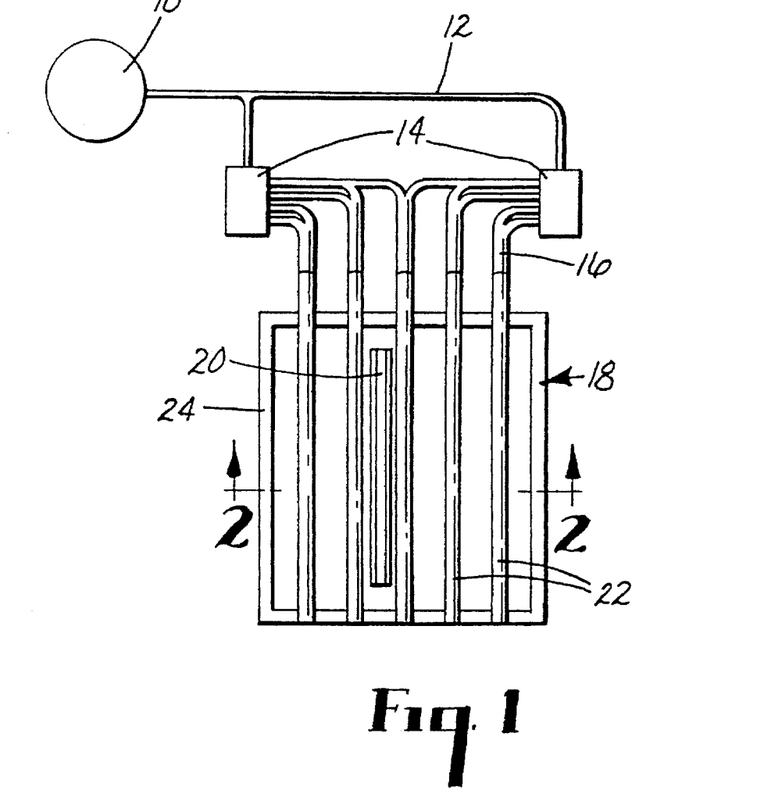
FIG. 1 is schematic representation of a large scale water vapor system useful for screen printing according to the present invention.
Figure 2:
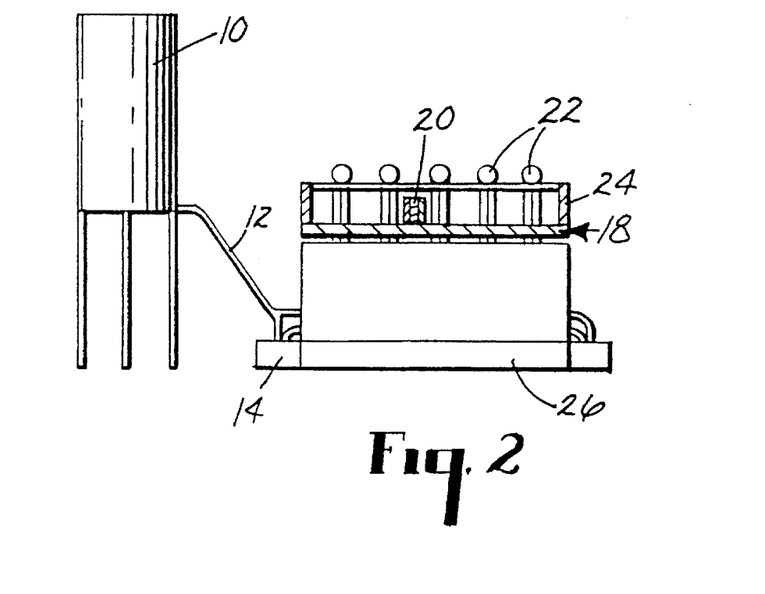
FIG. 2 is a cross-sectional view of FIG. 1 at 2—2.

To maintain a sufficient saturated volume of humidified air, vapor can be directed through conduits such as tubes, hoses, ducts, baffles, and encasements, and spread over the printing area of the printing stencil. For example, an apparatus such as illustrated in FIGS. 1 and 2, may be used for large scale screen printing, that is for print areas 100 cm by 100 cm (3 feet by 3 feet) and larger. The apparatus, as illustrated in FIGS. 3 and 4, may be used for small scale printing, that is, for print areas 100 cm by 100 cm (3 feet by 3 feet) and smaller.

Referring now to FIGS. 1 and 2, an exemplary water vapor system used to practice the present invention on a large screen printing scale is schematically illustrated. Deionized water is fed from a water reservoir 10 to a pair of ultrasonic fog generators 14. Ultrasonic fog generators 14 are connected to water reservoir 10 via water lines 12.

Once water has been vaporized in ultrasonic fog generators 14, the water vapor (not shown) is distributed over the surface of the screen printing surface (not shown) through a plurality of fog ducts 22, such that fog ducts 22 permit drainage of any condensed water in fog duct 22, without "raining" on the screen printing area and without interfering in the dispersal of the water vapor. Fog ducts 22 have a plurality of openings sufficiently large and numerous to deliver a sufficient volume of water vapor to the printing area and to maintain a relative humidity in the range of 75% to 100%. Typically, the openings have a diameter in the range of 0.5 to 1.25 cm and are placed along the bottom of each duct at opposite of least 30° from the linear center of each duct. Fog ducts 22 are generally sloped in such a manner so as to permit the condensed water to drain back through fog ducts 22 and into reservoir 10. Flexible tubing 16 connects ultrasonic fog generators 14 to fog ducts 22. Fog ducts 22 are supported by a bracket 24, such that fog ducts 22 are positioned over screen printing frame 18 and screen press 26. Positioned between fog ducts 22 and screen printing frame 18, are a squeegee and flood bar assembly 20. A baffle (not shown) around the perimeter of screen frame 18 contains the water vapor within the screen printing area. Although a conventional American screen press, clam shell-type with a 132 cm×203 cm (52 inch by 80 inch) print capability (American Viking, Advance Process Supply Co.) is exemplified in the Examples hereinbelow, any screen printing equipment known to those skilled in the art is within the scope of the present invention.

Figure 3:
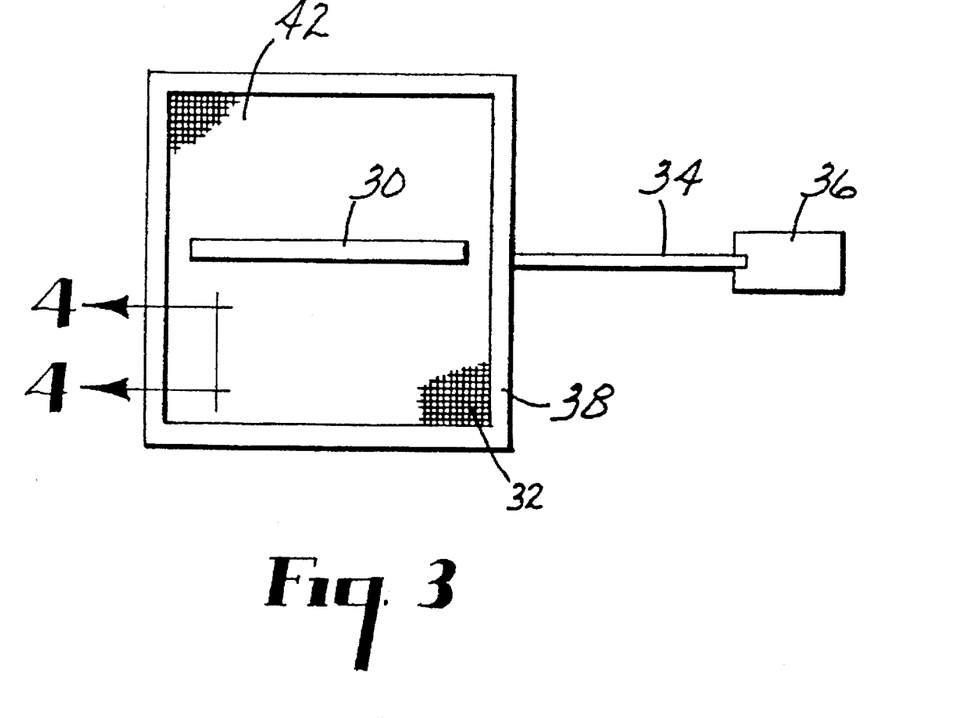
FIG. 3 is a schematic representation of a small scale water vapor system useful for screen printing according to the present invention.
Figure 4:
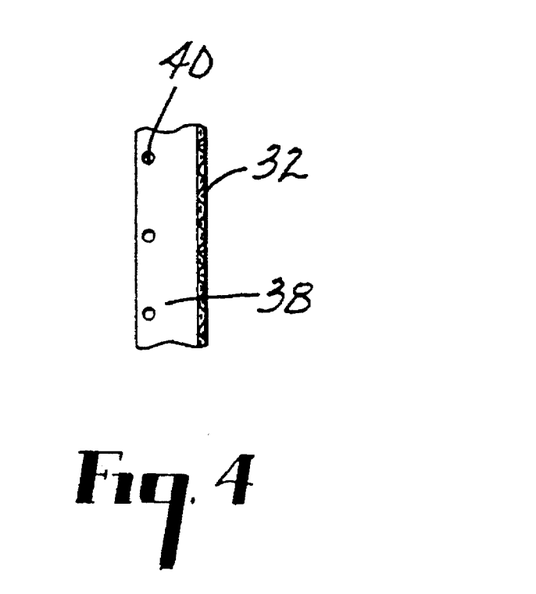
FIG. 4 is a cross-sectional view of FIG. 3 at 4—4.

Referring now to FIGS. 3 and 4, an exemplary water vapor system used to practice the present invention on a small screen printing scale is schematically illustrated. Water (not shown) is fed into an ultrasonic fog generator 36. Once water has been vaporized in ultrasonic fog generator 36, the water vapor (not shown) is directed throughout screen frame 38, fabricated from aluminum rectangular tubing and distributed over the surface of the screen printing surface (not shown) through a plurality of holes 40, positioned on the inside perimeter of screen frame 38.

Holes 40 are positioned on the upper portion of screen frame 38, that is, away from the screen printing mesh 32, such that screen frame 38 permits drainage of condensed water without "raining" on the screen printing area. As described in reference to FIGS. 1 and 2, the size and magnitude of holes in the frame should be sufficient to deliver an appropriate volume of water vapor to the printing area and to maintain a relative humidity in the range of 85% to 100%. Flexible tubing 34 connects ultrasonic fog generator 36 to screen frame 38. A squeegee 30 is positioned over the screen printing area 42.

In the next step in the screen printing process of the present invention, a water-based chemical composition is applied to the screen.

The fourth step in the screen printing process is printing an image onto a substrate according to conventional screen printing techniques. Conventional or traditional screen printing is described, for example in Van Druppen, "Manual for Screen Printing," (Verlag der Siebdruck, Lübeck, Germany, 1982), Scheer, "Graphic Screen Printing," (Zurich Bolting Cloth Mfg. Co. Ltd., Rüschlikone, Switzerland), and Kosloff, "Screen Printing Techniques," Sign of the Times, (Cincinnati, Ohio, 1981) and the descriptions for such screen printing are incorporated herein by reference.

Substrates suitable for practicing the present invention include commercially available substrates available under the tradenames Scotchcal™, Scotchlite™, Controltac™ films and Panaflex™ sign substrate (available from Minnesota Mining and Manufacturing Company, St. Paul, Minn.). Other substrates suitable for practicing the present invention are those having good color retention characteristics and for outdoor displays, weather resistance as well. Suitable porous or nonporous substrates include but are not limited to polycarbonate, polyester, polyethylene terephthalate, polymethyl methacrylate, polyethylene, fluoropolymer substrates, polyvinyl chloride, pressure sensitive vinyls, polyurethane, acrylate and methacrylate films and sheetings.

Once a substrate has been screen printed, the printed substrate is dried to promote ink adhesion to the substrate, generally in the range of 35° C. to 95° C., preferably in the range of 35° C. to 80° C. The printed substrate can be placed under infrared lamps to promote such adhesion. For screen printing systems that employ a web drive, the drying web speed is in the range of 7.0 m.min$^{-1}$ to 30.0 m.min$^{-1}$, preferably in the range of 9.0 m.min$^{-1}$ to 15.0 m.min$^{-1}$. The web speed, or dwell time of the printed substrate is dependent upon the drying temperature. Sufficient adhesion to the substrate can be ascertained by subjecting the printed substrate to ASTM D3359-74 Method B.

Objects and advantages of this invention are further illustrated by the following examples, but the particular materials and amounts thereof recited in these examples, as well as other conditions and details, should not be construed to unduly limit this invention. Unless otherwise stated or apparent, all materials used are commercially available.

EXAMPLES

Glossary
MAA methacrylic acid
PBA polybutyl acrylate
PBMA polybutyl methacrylate
PMMA polymethyl methacrylate

| Component | Type | Identity | Description | Supplier |
| --- | --- | --- | --- | --- |
| a | vehicle emulsion | Neocryl A-640 | PMMA/PBMA | ICI Americas |
| b | " | Joncryl 538 | styrene/acrylic acid | S. C. Johnson |
| c | " | Neocryl A-1044 | PMMA/PBA/MAA | ICI Americas |
| d | " | Joncryl 74 | styrene/acrylic acid | S. C. Johnson |
| e | " | Neorez R-960 | urethane dispersion | ICI Americas |
| f | " | Rhoplex A-507 | acrylic acid | Rohm & Haas |
| g | " | Neocryl A-612 | PMMA/PBMA | S. C. Johnson |
| h | " | Ucar 503 | modified acrylic acid | Union Carbide |
| j | " | WL-81 | acrylic acid | Rohm & Haas |
| k | " | Carboset XL-33 | acrylic acid | B. F. Goodrich |
| m | " | Witcobond W-234 | aliphatic urethane | Witco Corp. |
| n | thickener | Acrysol TT-678 | nonionic thickener | Rohm & Haas |
| p | " | Acrysol QR-708 | nonionic surfactant | Rohm & Haas |
| q | defoamer | Foamaster 111 | hydrophobic surfactant | Henkel Chemicals |
| r | " | BYK 035 | hydrophobic mineral oil | BYK-Chemie USA |
| s | " | Interfoam X-1 | petroleum hydrocarbon | Akzo Chemicals |
| t | " | Dow HV-490 | silicone emulsion | Dow Corning |
| u | biocide | Troyson 192 | amine biocide | Troy Chemical |
| v | fungicide | Polyphase AF-1 | carbamate fungicide | Troy Chemical |
| w | " | Nopcocide N-40-D | tetrachloroisophthalonitrile | Diamond Chemical |
| x | UV absorber | Sanduvor 3041 | benzophenone | Sandoz Chemical |
| y | " | Uvinul N-539 | substituted propenoic acid | BASF Corp. |
| z | flow agent | Fluorad FC-120 | perfluorinated surfactant | 3M |
| aa | leveling agent | #14 Additive | silicone glycol | Dow Chemical |
| bb | light stabilizer | Tinuvin 292 | hindered amine | Ciba-Geigy Corp. |
| cc | " | Sanduvor 3051 | hindered amine | Sandoz Chemicals |

EXAMPLES 1–8

Preparation of Uncoalesced Water-Based Inks

Several water-based inks were prepared by using the following general procedure (exemplified using the components of Example 1) and substituting the components summarized in Tables 1 and 2. The amounts of the components are given in weight %. The components are identified by referring to the component key. The pigments used in the inks of the present invention are commercially available from Penn Color, under the trade name of "Aqualor." The pigments are a pigment dispersion having a pigment solids content of from 30% to 60%, depending on the pigment color.

Example 1

Preparation of Blue Water-Based Ink:

The following components were combined and mixed together in a 55 gallon drum mixer. Each component was added to the vortex of the mixture while mixing at low shear.

233.7 lbs of ICI A-612 acrylic emulsion; 9 lbs of Foamaster 111 defoamer; 0.45 lb of Troysan 192 biocide; 0.75 lb of Polyphase AF-1 fungicide; 3 lbs of Sanduvor 3041 UV absorber; 0.3 lb of Fluorad FC-120 flow agent; 0.3 lb of Dow #14 leveling agent; 48 lbs of Aqualour 248-0061 RS blue pigment dispersion and approximately 4.5 lbs of Acrylsol TT-678 thickener to achieve a viscosity of approximately 2.8 pascal seconds.

The mixture was mixed for approximately 30 minutes at low shear and then tested for a grind of 7+ on a Hegman Grind Gauge (range of 0 to 7) with no seeds or nibs allowed. Approximately 300 lbs of ink were produced.

EXAMPLES 9–14

Preparation of Water-Based Clear Coats

Several water-based clear coats were prepared by using the following general procedure (exemplified using the components of Example 1) and substituting the components summarized in Tables 3 and 4. The amounts of the components are given in weight %. The components are identified by referring to the component key.

Example 9

Preparation of Water-Based Clear Coat:

The following components were combined and mixed together in a 55 gallon drum mixer. Each component was added to the vortex of the mixture while mixing at low shear. 138.0 lbs of ICI A-612 acrylic emulsion; 138.0 lbs of ICI R-960 urethane; 9 lbs of Dow HV-490 defoamer; 0.45 lb of Troysan 192 biocide; 0.75 lb of Polyphase AF-1 fungicide; 4.5 lbs Uvinul N-539 UV absorber; 6.0 lbs of Sanduvor 3051 light stabilizer; 0.3 lb of Fluorad FC-120 leveling agent; and 3.0 lbs of Acrysol TT-678 was added for thickening mixture to a desired viscosity.

The mixture was mixed for approximately 30 minutes at low shear and then tested for seeds and/or nibs in the mixture. Approximately 300 lbs of clear coat were produced.

TABLE 1

Water Based Inks

| Components | Example 1 | | Example 2 | | Example 3 | | Example 4 | |
|---|---|---|---|---|---|---|---|---|
| | Key | wt % | Key | wt % | Key | wt % | Key | wt % |
| Vehicle Emulsion 1 | a | 60.0 | b | 39.7 | a | 88.0 | a | 44.0 |
| Vehicle Emulsion 2 | c | 20.0 | d | 39.7 | — | — | e | 43.5 |
| Thickener | n | 1.0 | n | 1.0 | n | 1.5 | n | 1.5 |
| Defoamer | q | 1.5 | q | 1.5 | q | 1.0 | q | 1.0 |
| Biocide | u | 0.15 | u | 0.15 | — | — | — | — |
| Fungicide | v | 0.25 | v | 0.25 | v | 0.5 | v | 0.5 |
| U.V. Absorber | x | 1.0 | x | 1.5 | x | 1.0 | x | 1.0 |
| Flow Agent | z | 0.10 | z | 0.10 | — | — | z | 0.50 |
| Leveling Agent | — | — | aa | 0.05 | — | — | — | — |
| Pigment Dispersion | | 16.0 | | 16.0 | | 8.0 | | 8.0 |
| Viscosity (Pa·s) (press ready) | | 2.2 | | 2.5 | | 2.2 | | 2.2 |

TABLE 2

Water Based Inks

| Component | Example 5 | | Example 6 | | Example 7 | | Example 8 | |
|---|---|---|---|---|---|---|---|---|
| | Key | wt % | Key | wt % | Key | wt % | Key | wt % |
| Vehicle Emulsion 1 | e | 82.0 | f | 75.25 | g | 77.9 | h | 75.0 |
| Vehicle Emulsion 2 | — | — | — | — | — | — | — | — |
| Thickener | n | 1.5 | n | 2.5 | n | 1.5 | p | 3.0 |
| Defoamer | q | 2.0 | q/r | 2.5 | s | 3.0 | q | 3.0 |
| Biocide | u | — | u | 0.25 | u | 0.15 | — | — |
| Fungicide | v | 0.5 | v | 0.25 | v | 0.25 | w | 0.5 |
| U.V. Absorber | x | 1.0 | x | 1.0 | x | 1.0 | x | 1.0 |
| Flow Agent | z | — | z | 0.25 | z | 0.1 | z | 0.50 |
| Leveling Agent | — | — | — | — | aa | 0.1 | — | — |
| Pigment Dispersion | | 8.0 | | 18.0 | | 16.0 | | 17.0 |
| Viscosity (Pa·s) (press ready) | | 1.6 | | | | | | |

(q) 2.0% wt./(r) 0.5% wt.

TABLE 3

| | Water-Based Clear Coats | | | | | |
| --- | --- | --- | --- | --- | --- | --- |
| | Example 9 | | Example 10 | | Example 11 | |
| Component | Key | wt % | Key | wt % | Key | wt % |
| Vehicle Emulsion 1 | j | 93.75 | k | 92.5 | g | 92.0 |
| Vehicle Emulsion 2 | — | — | — | — | — | — |
| Thickener | n | 0.50 | n | 1.0 | n | 1.0 |
| Defoamer | q | 2.0 | q | 3.0 | ct | 3.0 |
| Biocide | u | 0.25 | u | 0.25 | u | 0.15 |
| Fungicide | v | 0.25 | v | 0.25 | v | 0.25 |
| U.V. Absorber | y | 1.0 | y | 1.5 | y | 1.5 |
| Light Stabilizer | bb | 1.5 | bb | 1.0 | bb | 2.0 |
| Flow Agent | z | 0.25 | z | 0.25 | z | 0.1 |
| Leveling Agent | aa | 0.5 | aa | 0.25 | — | — |

TABLE 4

| | Water-Based Clear Coats | | | | | |
| --- | --- | --- | --- | --- | --- | --- |
| | Example 12 | | Example 13 | | Example 14 | |
| Component | Key | wt % | Key | wt % | Key | wt % |
| Vehicle Emulsion 1 | e | 92.0 | m | 92.5 | e | 46.0 |
| Vehicle Emulsion 2 | — | — | — | — | g | 46.0 |
| Thickener | n | 1.0 | n | 1.0 | n | 1.0 |
| Defoamer | t | 3.0 | q | 3.0 | t | 3.0 |
| Biocide | u | 0.15 | u | 0.25 | u | 0.15 |
| Fungicide | v | 0.25 | v | 0.25 | v | 0.25 |
| U.V. Absorber | y | 1.5 | y | 1.5 | y | 1.5 |
| Light Stabilizer | cc | 2.0 | bb | 1.0 | cc | 2.0 |
| Flow Agent | z | 0.1 | z | 0.25 | z | 0.1 |
| Leveling Agent | — | — | aa | 0.25 | — | — |

EXAMPLE 15

A small screen frame (61 cm×76 cm (24 inches×30 inches)) was prepared from rectangular aluminum tubing having holes drilled around the inside perimeter of the frame, see FIGS. 3 and 4. A screen was prepared with a test pattern centered on the screen. The printing stencil was pre-conditioned with water just prior to the addition of the water-based chemical composition.

Water was vaporized in an ultrasonic fog generator. The resulting water vapor was vented through the frame and exhausted out through the holes and onto the printing area of the screen. Water vapor was vented onto the printing area for the entire printing process.

A substrate was printed using the formulation of Example 1. The ink was applied to the screen using a flood bar. The pigmented water-based chemical composition was then deposited through the screen onto a substrate using a squeegee. The printed substrate was dried at 65° C. (150° F.) for 30 seconds. One hundred sheets of Scotchcal™ 180-10 vinyl film (Minnesota Mining and Manufacturing Co., St. Paul, Minn.) were run without any difficulties. The sheets were stacked and were non-blocking.

EXAMPLE 16

A substrate was printed according to the conditions of Example 15, using the formulation of Example 1, except a larger screen size was used. The screen frame size was 117 cm×157 cm (46 inches×62 inches). One hundred sheets of Scothcal™ 180-10 vinyl film were printed with good results with 0.015 cm (6 mil) lines printing well throughout the printing test.

EXAMPLE 17

A substrate was printed using the same screen frame size as Example 16, and the formulation of Example 1, except the water vapor produced in the ultrasonic fog generators was directed through 10 cm (4 inches) fog ducts, having exit holes running along the bottom of each duct at opposite 30° from the linear center line of each duct. The fog duct array was positioned over the printing area as illustrated in FIGS. 1 and 2. One hundred sheets of Scotchcal™ vinyl film were printed with good results with 0.015 cm (6 mil) lines printing well throughout the printing test.

EXAMPLE 18

A printed substrate was prepared using the formulation of Example 2, and using the following equipment and materials:

a clam shell-type American screen press (available from Advance Process Supply Co.);

screen size of 188 cm×249 cm (74 inches×98 inches), using a PE-230 mesh (available from Tetko, Inc. Briarcliff, N.Y. or Midwest Sign Supply);

print size of 122 cm×183 cm (48 inches×72 inches), with fine detail and masstone areas;

substrate was Scotchcal™ 3650 vinyl film (available from Minnesota Mining and Manufacturing Co., St. Paul, Minn.);

printed substrate dryer was a 152 cm (60 inch) web width jet dryer (available from American Screen Printing Equipment);

two ultrasonic water vaporizers (Sonicmisty™ CFK 1A available from Tamori Fog, Inc., Concord, Calif.);

fog ducts, 10 cm (4 inches) in diameter and 191 cm (75 inches) long with 0.79 cm (0.312 inch) diameter holes running along the bottom of each duct at opposite 30° from the linear center line of each duct;

humidity and temperature gauge (Abbeon Cal. Inc. Model M2A4B); and deionized water.

The printing stencil was pre-conditioned with water just prior to the addition of ink. The plastic vapor tubes were positioned equidistant from each other above the printing area and deposited sufficient volume of water vapor during the entire printing process. A relative humidity of approximately 98% was maintained over the print area, and room temperature was maintained at 22° C. (72° F.). The printed substrate was dried at 71° C. (160° F.) and at a belt-web speed of 10 m.min$^{-1}$, for approximately 45 seconds.

The above process was repeated using the unpigmented composition formulation of Example 14, except the unpigmented composition was flood-coated through an open screen.

The ink performance showed good flow, coverage, screenability, fast drying, non-blocking, maintained a constant viscosity, good adhesion and low odor.

One hundred sheets of vinyl film were printed with good results. Good ink coverage on masstone areas was observed. The holding of fine detail 0.015 cm (6 mil) lines were attained and held throughout the 100 sheet run. The sheets were stacked immediately and were non-blocking, that is, the printed vinyl sheets were not tacky and did not stick together when a printed sheet was lifted from a stacked amount of sheets.

Various modifications and alterations of this invention will become apparent to those skilled in the art without departing from the scope and principles of this invention and it should be understood that this invention is not to be unduly limited to this illustrative embodiment set forth hereinabove.

We claim:

1. A screen printing process comprising the steps:

(a) pre-conditioning a screen-printing stencil with water at a pre-determined time prior to applying a press-ready water-based chemical composition;

(b) saturating a volume above the printing surface with water vapor, such that the water vapor is intimately positioned over said printing surface, such that said volume remains saturated with the water vapor during subsequent steps (c) and (d);

(c) applying the press-ready water-based chemical composition to the screen-printing stencil, wherein the composition comprise:

(1) 35 to 85% by weight based on the total water-based chemical composition of an acrylic emulsion, urethane dispersion, an acrylic/urethane emulsion, or a styrene/acrylic emulsion; and (2) 0 to 25% by weight based on the total water-based chemical composition of a durable pigment; and (d) screen printing a substrate.

2. The screen printing process according to claim 1, wherein said volume saturated with a water vapor has a relative humidity in the range of 75% to 100%.

3. The screen printing process according to claim 1, wherein said substrate is selected from the group consisting of polycarbonate, polyethylene terephthalate, polymethyl methacrylate, polyethylene, fluoropolymer substrates, polyvinyl chloride, pressure sensitive vinyls, polyurethane, acrylate and methacrylate films and sheetings.

4. The screen printing process according to claim 1, wherein said pre-conditioning step includes wiping the surface of said stencil with water or subjecting the stencil to water vapor.

5. A screen printing process comprising the steps:

(a) pre-conditioning a screen-printing stencil with water at a pre-determined time prior to applying a press-ready water-based chemical composition;

(b) saturating a volume above the printing surface with water vapor, such that the water vapor is intimately positioned over said printing surface, such that said volume remains saturated with the water vapor during subsequent steps (c) and (d);

(c) applying the press-ready water-based chemical composition to the screen-printing stencil, wherein the composition comprise:

(1) 35 to 85% by weight based on the total water-based composition of an acrylic emulsion, urethane dispersion, an acrylic/urethane emulsion, or a styrene/acrylic emulsion; and (2) 0 to 25% by weight based on the total water-based composition of a durable pigment; and (d) screen printing a substrate;

(e) drying the printed substrate;

(f) positioning the dried printed substrate onto the printing surface;

(g) saturating a volume above the printing surface with water vapor, such that the water vapor is intimately positioned over said printing surface, such that said volume remains saturated with the water vapor during subsequent steps (h) and (i);

(h) applying a press-ready water-based unpigmented chemical composition, wherein the unpigmented chemical composition comprises 35 to 85% by weight of the total water-based unpigmented chemical composition an acrylic emulsion, urethane dispersion, an acrylic/urethane emulsion, or a styrene/acrylic emulsion to an open screen; and (i) flood coating the printed substrate with the water-based unpigmented composition through the open screen.

* * * * *

UNITED STATES PATENT AND TRADEMARK OFFICE
CERTIFICATE OF CORRECTION

PATENT NO.: 5,462,768

DATED: Oct. 31, 1995

INVENTOR(S): Adkins et al.

It is certified that error appears in the above-identified patent and that said Letters Patent is hereby corrected as shown below:

Col. 1, line 36, Delete "greens" and insert --screens--;

Col. 2, line 46, Delete "semen" and insert --screen--;

Col. 5, line 17, Delete "carded" and insert --carried--; and

Col. 6, line 27, Delete "duct" and insert --ducts--

Signed and Sealed this

Eighteenth Day of June, 1996

Attest:

BRUCE LEHMAN

*Attesting Officer*   Commissioner of Patents and Trademarks